June 7, 1949.  J. BERGER  2,472,398
ARRANGEMENT FOR OPERATING OIL BURNERS
Filed Oct. 12, 1946

INVENTOR.
Jack Berger
BY

Patented June 7, 1949

2,472,398

UNITED STATES PATENT OFFICE 2,472,398

ARRANGEMENT FOR OPERATING OIL BURNERS

Jack Berger, Laurelton, Long Island, N. Y., assignor to Diesel Oil Burner Corporation of New York, Jamaica, N. Y.

Application October 12, 1946, Serial No. 703,080

11 Claims. (Cl. 158—28)

My present invention relates to arrangements for controlling the operation of oil burners.

It is an object of my present invention to provide a control arrangement which is simple to install and reliable in operation.

It is a further object of my present invention to provide arrangements for controlling the operation of oil burners which are of sturdy construction and operate well even after considerable time of use.

With the above objects in view, my present invention mainly relates to an arrangement for controlling the operation of an oil burner including a burner motor for supplying oil, an ignition device for igniting this oil, a source of electric current, a burner circuit connecting this source of electric current with the burner motor and an ignition circuit connecting this source of electric current with the ignition device mentioned above; my new arrangement itself comprises in combination a series of elements namely: a rotatable timer motor, a timer circuit connecting this rotatable timer motor with the above mentioned source of electric current, a thermostatic timer switch included in this timer circuit and constructed so as to automatically disconnect the above mentioned rotatable timer motor from the source of electric current when the temperature of this timer switch rises above a predetermined temperature, ignition switch means included in the above mentioned ignition circuit and operated by the rotatable timer motor so as to be in open position when this timer motor is connected with the source of electric current and to be in closed position when the timer motor is disconnected from the source of electric current, and combined burner and ignition switch means included in the above mentioned ignition and burner circuits and operated by the rotatable timer motor so as to be in open position when said rotatable timer motor has turned a predetermined period of time without being disconnected from the source of electric current.

In accordance with a preferred embodiment of my present invention, I provide rotatable operating means rotatably connected with the above defined timer motor and adapted to be turned by this motor from an initial into a final position; in the event such rotatable operating means are provided, the ignition switch means, also defined above, are operated by these rotatable operating means so as to be in open position when these operating means are in initial position; furthermore, in case of provision of rotatable operating means, the combined burner and ignition switch means are operated by these rotatable operating means so as to be in open position when the said rotatable operating means are in their final position defined above.

It is also advisable to provide means, e. g. spring means adapted to turn the above rotatable operating means from their final position back into their initial position and to hold them in this latter position, if they are not turned by the rotatable timer motor as described above.

In order to ensure that the rotatable operating means are turned by the timer motor from their initial into their final position within a predetermined period of time, I have found it advisable to provide means connected with the timer motor and the operating means for slowing down the speed of these operating means and keeping this speed substantially constant.

In accordance with a particularly preferred embodiment of my present invention, I provide also means for closing the combined burner and ignition switch the moment when the rotatable operating means are turned by the rotatable timer motor from their initial position.

The combined burner and ignition switch and the means for closing and opening the same are preferably a separate, substantially independent arrangement including a series of elements, namely: means tending to hold the combined burner and ignition switch in open position, a relay adapted to close this switch when energized, a relay circuit connecting this relay with the above mentioned source of electric current, a first relay switch included in this relay circuit, means tending to close this first relay switch, means operated by the above mentioned rotatable operating means so as to be adapted to open this first relay switch when the rotatable operating means are in the above defined final position, a second relay switch included also in the relay circuit, means tending to close this second relay switch, and means operated by the rotatable operating means and adapted to open this second relay switch when the rotatable operating means are in their initial position.

The arrangement defined in the preceding paragraph preferably comprises also a third relay switch included in the relay circuit parallel to the second relay switch, means tending to keep this third relay switch open and means operated by the relay itself for closing this third relay switch when the relay is energized.

In order to keep the temperature in the room to be heated by the oil burner within the desired predetermined temperature range, I have found it advisable to arrange in this room a thermostatic switch arrangement included in the timer and relay circuits and adapted to connect automatically the timer and/or the relay with said source of electric current when the temperature of the thermostatic switch arrangement falls under a predetermined temperature.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
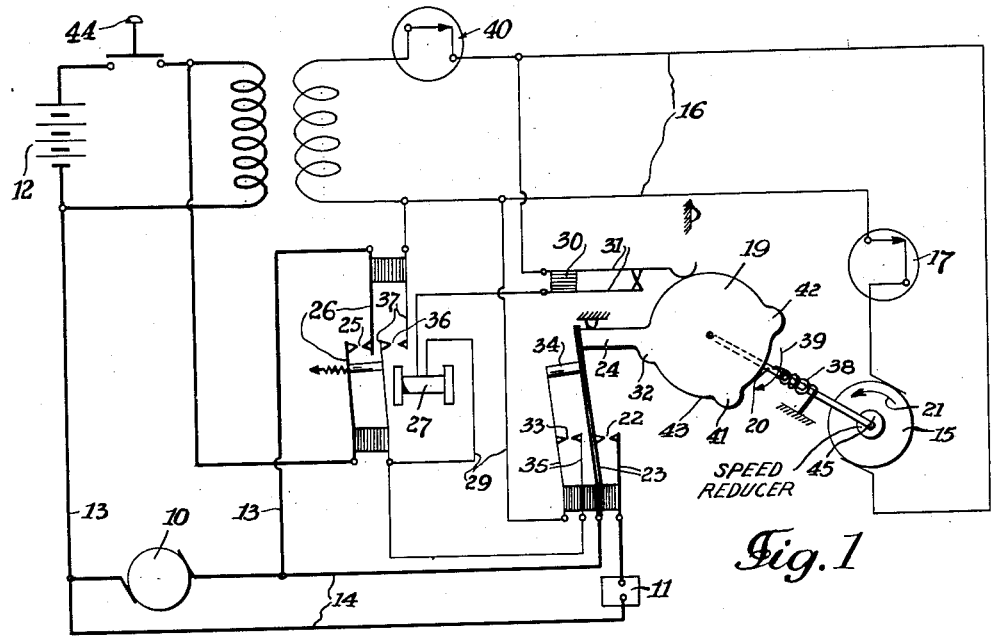
Fig. 1 shows a controlling arrangement according to my present invention in initial position.
Figure 3:
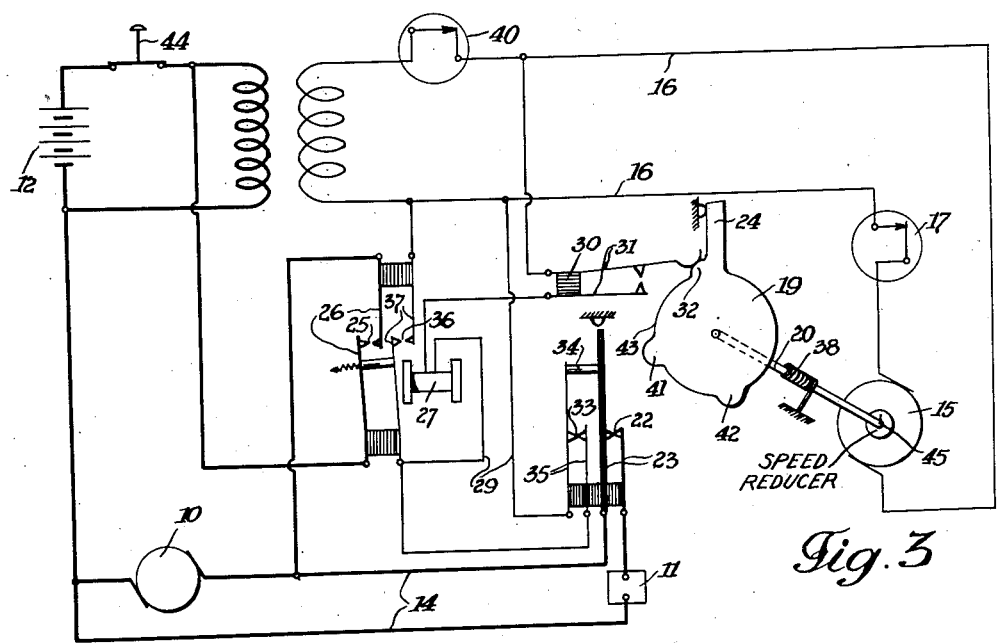
Fig. 3 shows the arrangement shown in Fig. 1 in final position.

The control arrangement proposed by me comprises the following main elements:

A burner motor 10 for supplying oil to the oil burner;

An ignition device 11 for igniting the oil supplied by the burner motor 10;

A source of electric current 12 for operating the above mentioned burner motor 10 and ignition device 11;

A burner circuit 13 connecting the source of electric current 12 with the burner motor 10;

An ignition circuit 14 connecting the source of electric current 12 with the ignition device 11;

A rotatable timer motor 15;

A timer circuit 16 connecting this rotatable timer motor 15 with the source of electric current 12;

An automatic thermostatic combustion responsive switch 17, preferably arranged in the smoke stack or flue of the oil burner, and constructed so as to disconnect automatically the timer motor 15 from the source of electric current when the temperature of the gases surrounding the combustion responsive switch 17 and the combustion responsive switch 17 itself rises above a predetermined temperature;

Rotatable operating means, e. g. a rotatable operating disc 19 connected by means of shaft 20 with the timer motor 15 and constructed so as to be adapted to be turned by this rotatable timer motor 15 in direction of arrow 21 from its initial position shown in Fig. 1 into its final position shown in Fig. 3;

Ignition switch means, e. g. an ignition switch 22 included in the ignition circuit 14;

Leaf springs 23 holding switch 22 and tending to keep this switch in closed position;

A projecting member 24 firmly connected to the rotatable operating disc 19 and rotating together with the same so as to move the switch 22 against action of the holding leaf springs 23 into open position when the rotatable operating disc 19 is in its initial position shown in Fig. 1;

Combined burner and ignition switch means, e. g. a switch 25 included in the burner and ignition circuits 13 and 14;

Leaf springs 26 holding switch 25 and tending to keep this switch in open position;

A relay 27 adapted to close switch 25 by means of the connecting member 28 when the relay is energized;

A relay circuit 29 connecting the relay 27 with the source of electric current 12;

A first relay switch 30 included in the relay circuit 29;

Leaf springs 31 holding switch 30 and tending to keep this switch in closed position;

A projection 32 forming part of the projecting member 24 firmly connected to the rotatable operating disc 19 and rotating together with the same so as to move the switch 30 against action of the holding leaf springs 31 into open position when the rotatable operating disc 19 is in its final position shown in Fig. 3;

A second relay switch 33 included in the relay circuit 29 and operatively connected by the connecting member 34 with the ignition switch 22;

Leaf springs 35 holding switch 33 and tending to keep this switch in closed position so that this switch is moved by the projecting member 24 against action of the holding leaf springs 35 into open position when the rotatable operating disc 19 is in its initial position shown in Fig. 1;

A third relay switch 36 included in the relay circuit 29 parallel to the second relay switch 33;

Leaf springs 37 tending to keep switch 36 in open position and holding it in such a manner that switch 36 is closed against action of the leaf springs 37 by the relay 27 simultaneously with the switch 25 when the relay 27 is energized;

Spring means 38 cooperating with the shaft 20 tends to turn this shaft together with the timer motor 15 and operating disc 19 in direction of arrow 39 so as to turn the disc 19 and the motor 15 from their final position shown in Fig. 3 into their initial position shown in Fig. 1 when the motor 15 is disconnected from the source of electric current;

A thermostatic switch 40 arranged in the room to be heated and included in the timer and relay circuits 16 and 29 and adapted to connect automatically the timer motor 15 and the relay 27 with the source of electric current 12 when the temperature of this thermostatic switch 40 falls under a predetermined temperature; and Additional projections 41 and 42 arranged along the peripheral face 43 of the operating disc 19, as shown, so as to be adapted to open the first relay switch 30 twice while the operating disc 19 turns from its initial position shown in Fig. 1 into its final position shown in Fig. 3.

The above described elements of my arrangement are connected as clearly shown in the drawing so that further more explicit description of the circuit is superfluous.

Further details of my new arrangement will be easily understood from the following description of its mode of operation under different conditions:

First: It is assumed that both the burner motor and the ignition device are in perfect order, that the main switch 44 is closed, and that the temperature in the room in which the thermostatic switch 40 is arranged is so high that this switch is open. Under these conditions the burner motor 10 and the ignition device 11 will not operate, the smoke stack will be cold and consequently the thermostatic switch 17 arranged in the smoke stack will be closed.

When the temperature in the room in which switch 40 is arranged falls to the predetermined temperature for which switch 40 is set, this switch will be automatically closed. Such closing of switch 40 will have the following effects:

By closing of switch 40 the timer circuit 16 will be completed and the timer motor 15 will start to operate, i. e. to turn slowly in direction of arrow 21.

Such turning of the timer motor 15 will result in turning of the operating disc 19 and the projecting member 24 mounted thereon. Turning of the projecting member 24 from its initial position shown in Fig. 1 will result, as clearly explained above, in closing of the two switches 22 and 33 by action of the holding leaf springs 23 and 35, respectively.

As evident from the drawing, closing of switch 33 will complete the relay circuit 29 resulting in energization of the relay 27; the thus energized relay in turn will close the switches 25 and 36. Closing of switch 25 will complete the burner circuit 13 and the burner motor 10 will start to operate.

As also evident from the drawing, closing of switch 22 will complete the ignition circuit 14 and result in operation of the ignition device 11.

Thus, closing of the thermostatic switch 40 results in turning of the timer motor 15 and the operating disc 19 which in turn starts operation of the burner motor 10 and the ignition device 11.

If, as assumed above, the burner motor 10 and the ignition device 11 operate properly, the oil burner will quickly get hot and the temperature in the smoke stack will rise and reach the predetermined temperature at which switch 17 automatically opens. At this temperature, the switch 17 will open; this results in disconnection of the timer motor 15 from the source of electric current 12.

The thus disconnected timer motor 15 together with the operating disc 19 will then be turned back by means of spring 38 into the initial position shown in Fig. 1.

As soon as the operating disc 19 reaches its initial position, the projecting arm 24 opens the switches 33 and 22. Opening of switch 22 again interrupts the ignition circuit 14 and stops operation of the ignition device 11. Opening of switch 33 will, however, have no effect on the relay circuit 29 since the same is kept closed by switch 36 despite opening of switch 33. Thus, switch 25 will stay closed and the burner motor 10 will operate despite opening of switch 33.

The burner motor will operate so long as the thermostatic switch 40 stays closed. As soon as this switch opens due to rise of temperature in the room, the relay circuit 29 will be interrupted, the relay 27 deenergized and switch 25 opened. This will result in interruption of the burner circuit 13 and stopping of burner motor 10.

Thus, if both the burner motor and the ignition device are in order, closing of the room thermostatic switch 40 will result in operation of the ignition device until the smoke stack gets hot and the switch 17 opens, and in operation of the burner motor 10 until the room in which switch 40 is arranged reaches the temperature at which this switch is automatically opened.

Second: It is assumed the burner motor and/or the ignition device do not work, i. e. no oil is supplied and/or no ignition spark is created. In this event, closing of the switch 40 due to falling of the temperature will result in the same manner as described above in operation of the timer motor 15 and the operating disc 19 which in turn will connect by the various switches described above the burner motor 10 and the ignition device 11 with the source of electric current 12.

However, due to failure of the burner motor 10 and/or the ignition device 11 to operate properly, the oil in the oil burner will not burn and consequently the temperature in the smoke stack will not rise and the switch 17 will remain closed.

In this event, the timer motor 15 will not be disconnected from the source of electric current by switch 17 as described above but will continue to operate until it reaches the final position shown in Fig. 3. In this final position, the projection 32 will open the switch 30 and thus interrupt the relay circuit 29 which causes deenergization of the relay 27. Such deenergization of the relay 27 in turn results in opening of the switch 25 which causes interruption of the burner and ignition circuits 13 and 14 and stoppage of both the burner motor 10 and the ignition device 11.

The timer motor 15 is combined with governor means 45 forcing the shaft 20 to turn at a relatively low speed so that it takes a relatively long time, e. g. about one minute, until the same and the operating disc 19 turn from their initial position shown in Fig. 1 into their final position shown in Fig. 3. This gives the burner motor and the ignition device about a full minute to start operation.

Figure 2:
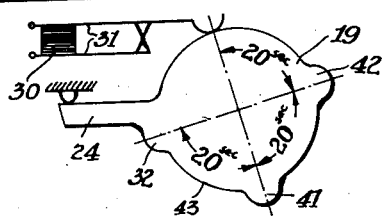
Fig. 2 shows a front view of a part of the timing means used in the arrangement shown in Fig. 1.

In order to give the burner motor and/or the ignition device several impulses if one or both of them do not operate, I provide, as clearly shown in Fig. 2, on the operating disc 19 two additional projections 41 and 42 which open twice the switch 30 for predetermined short time periods. This results each time in stoppage of both the burner motor 10 and the ignition device 11 and repeated start of the same.

If despite these impulses the burner motor and the ignition device do not operate properly, the timer motor 15 will turn, as described above, together with the operating disc 19 into its final position shown in Fig. 3 and stay in this position, permanently disconnecting and stopping both the burner motor and the ignition device. This is an indication that either the ignition device or the burner motor or both are out of order and have to be repaired. After the necessary repairs have been made, the entire arrangement is manually turned back into its initial position.

Summarized, my new arrangement operates as follows:

If the room temperature falls, the switch 40 closes and both the burner motor and the ignition device will be operated for a predetermined period of time, say 20 seconds. Then they will be stopped for a short period, e. g. five seconds, thereafter they will be operated again for, say, 20 seconds and stopped again for a short period, e. g. 5 seconds. Then they will be operated again for, say 20 seconds and then they will be stopped finally.

If at any time during this operation the smoke stack gets hot, the switch 17 will open stopping the ignition device and leaving the burner motor to operate. The burner motor will then be operated alone and will be stopped only when the room has reached the desired predetermined temperature and room switch 40 opens.

It will be understood that each of the elements described above, or two or more together, may also find a useful application in other types of controlling arrangements, differing from the types described above.

While I have illustrated and described the invention as embodied in arrangements for controlling the operation of oil burners, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning

What I claim as new and desire to secure by Letters Patent is:

1. An arrangement for operating an oil burner comprising in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; and means operated by said rotatable operating means for opening said second relay switch when said rotatable operating means are in said initial position of the same.

2. An arrangement for operating an oil burner including in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; third relay switch means included in said relay circuit parallel to said second relay switch means; means tending to keep said third relay switch open; and means operated by said relay for closing said third relay switch when said relay is energized.

3. An arrangement for operating on oil burner comprising in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; and means adapted to turn said rotatable operating means from their final into their initial position and to hold them in the latter position if said rotatable operating means are not turned by said rotatable timer motor.

4. An arrangement for operating an oil burner including in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; third relay switch means included in said relay circuit parallel to said second relay switch means; means tending to keep said third relay switch open; means operated by said relay for closing said third relay switch when said relay is energized; and means adapted to turn said rotatable operating means from their final into their initial position and to hold them in the latter position if said rotatable operating means are not turned by said rotatable timer motor.

5. An arrangement for operating an oil burner including in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; means connected with said rotatable timer motor and said rotatable operating means for slowing down the speed of the latter and keeping said speed substantially constant; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; and means operated by said rotatable operating means for opening said second relay switch when said rotatable operating means are in said initial position of the same.

6. An arrangement for operating an oil burner including in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; means connected with said rotatable timer motor and said rotatable operating means for slowing down the speed of the latter and keeping said speed substantially constant; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; third relay switch means included in said relay circuit parallel to said second relay switch means; means tending to keep said third relay switch open; and means operated by said relay for closing said third relay switch when said relay is energized.

7. An arrangement for operating an oil burner including in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; means connected with said rotatable timer motor and said rotatable operating means for slowing down the speed of the latter and keeping said speed substantially constant; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; and spring means adapted to turn said rotatable operating means from their final into their initial position and to hold them in the latter position if said rotatable operating means are not turned by said rotatable timer motor.

8. An arrangement for operating an oil burner including in combination a burner motor for suplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; means connected with said rotatable timer motor and said rotatable operating means for slowing down the speed of the latter and keeping said speed substantially constant; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; third relay switch means included in said relay circuit parallel to said second relay switch means; means tending to keep said third relay switch open; means operated by said relay for closing said third relay switch when said relay is energized; and spring means adapted to turn said rotatable operating means from their final into their initial position and to hold them in the latter position if said rotatable operating means are not turned by said rotatable timer motor.

9. An arrangement for operating an oil burner including in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; means connected with said rotatable timer motor and said rotatable operating means for slowing down the speed of the latter and keeping said speed substantially constant; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; third relay switch means included in said relay circuit parallel to said second relay switch means; means tending to keep said third relay switch open; means operated by said relay for closing said third relay switch when said relay is energized; spring means adapted to turn said rotatable operating means from their final into their initial position and to hold them in the latter position if said rotatable operating means are not turned by said rotatable timer motor; and a thermostatic switch arrangement included in said timer and said relay circuits and adapted to connect automatically said timer and said relay with said source of electric current when the temperature of said thermostatic switch arrangement falls under a predetermined temperature.

10. An arrangement for operating an oil burner including in combination a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; rotatable operating means rotatably connected with said timer motor and adapted to be turned by said rotatable timer motor from an initial position into a final position; means connected with said rotatable timer motor and said rotatable operating means for slowing down the speed of the latter and keeping said speed substantially constant; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; at least one additional means operated by said rotatable operating means for opening said first relay switch at least once for a short period of time while said rotatable operating means turns from said initial into said final position of the same; third relay switch means included in said relay circuit parallel to said second relay switch means; means tending to keep said third relay switch open; means operated by said relay for closing said third relay switch when said relay is energized; and spring means adapted to turn said rotatable operating means from their final into their initial position and to hold them in the latter position if said rotatable operating means are not turned by said rotatable timer motor.

11. An arrangement for operating an oil burner including a burner motor for supplying oil; an ignition device for igniting said oil; a source of electric current; a burner circuit connecting said source of electric current with said burner motor; an ignition circuit connecting said source of electric current with said ignition device; a rotatable timer motor; a timer circuit connecting said rotatable timer motor with said source of electric current; an automatic thermostatic combustion responsive switch included in said timer circuit and constructed so as to disconnect automatically said rotatable timer motor from said source of electric current when its temperature rises over a predetermined temperature; a rotatable operating means rotatably connected with said timer motor and adapted to be turned by said rotatable timer motor from an initial position into a final position; means connected with said rotatable timer motor and said rotatable operating means for slowing down the speed of the latter and keeping said speed substantially constant; ignition switch means included in said ignition circuit and operated by said rotatable operating means so as to be in open position when said rotatable operating means are in said initial position of the same; combined burner and ignition switch means included in said ignition and said burner circuits; means tending to hold said combined burner and ignition switch means in open position; a relay adapted to close said combined burner and ignition switch means when energized; a relay circuit connecting said relay with said source of electric current; a first relay switch included in said relay circuit; means tending to close said first relay switch; means operated by said rotatable operating means for opening said first relay switch when said rotatable operating means are in said final position of the same; second relay switch means included in said relay circuit; means tending to close said second relay switch; means operated by said rotatable operating means for opening said second relay switch when said rotatable operating means are in said initial position of the same; at least one additional means operated by said rotatable operating means for opening said first relay switch at least once for a short period of time while said rotatable operating means turns from said initial into said final position of the same; third relay switch means included in said relay circuit parallel to said second relay switch means; means tending to keep said third relay switch open; means operated by said relay for closing said third relay switch when said relay is energized; spring means adapted to turn said rotatable operating means from their final into their initial position and to hold them in the latter position if said rotatable operating means are not turned by said rotatable timer motor; and a thermostatic switch arrangement included in said timer and said relay circuits and adapted to connect automatically said timer and said relay with said source of electric current when the temperature of said thermostatic switch arrangement falls under a predetermined temperature.

JACK BERGER.

REFERENCES CITED

The following references are of record in the file of this patent:

UNITED STATES PATENTS

| Number | Name | Date |
|---|---|---|
| 1,985,986 | Hall | Jan. 1, 1935 |
| 1,986,032 | Townsend | Jan. 1, 1935 |
| 2,012,322 | Satchwell | Aug. 27, 1935 |
| 2,077,402 | Drake | Apr. 20, 1937 |
| 2,174,275 | Raney | Sept. 26, 1939 |
| 2,231,212 | Miller | Feb. 11, 1941 |
| 2,425,589 | Aubert | Aug. 12, 1947 |